US012645842B2

(12) United States Patent
Kabin et al.

(10) Patent No.: US 12,645,842 B2
(45) Date of Patent: Jun. 2, 2026

(54) CRYPTOGRAPHIC HARDWARE ACCELERATOR WITH DUMMY BLOCK ADDRESSING FOR PROTECTION AGAINST SIDE CHANNEL ATTACKS

(71) Applicant: IHP GmbH-Innovations for High Performance Microelectronics/Leibniz-Instit. für innovative Mikroelektronik, Frankfurt (DE)

(72) Inventors: Ievgen Kabin, Frankfurt (DE); Zoya Dyka, Frankfurt (DE); Dan Klann, Frankfurt (DE); Peter Langendörfer, Frankfurt (DE)

(73) Assignee: IHP GMBH—INNOVATIONS FOR HIGH PERFORMANCE MICROELECTRONICS / LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 86 days.

(21) Appl. No.: 18/476,898

(22) Filed: Sep. 28, 2023

(65) Prior Publication Data

US 2024/0111908 A1 Apr. 4, 2024

(30) Foreign Application Priority Data

Sep. 30, 2022 (EP) ..................................... 22199271
Feb. 24, 2023 (EP) ..................................... 23158541

(51) Int. Cl.
*G06F 21/72* (2013.01)
*G06F 7/58* (2006.01)
*G06F 21/60* (2013.01)

(52) U.S. Cl.
CPC .............. *G06F 21/72* (2013.01); *G06F 7/588* (2013.01); *G06F 21/602* (2013.01)

(58) Field of Classification Search
CPC ........ G06F 21/72; G06F 7/588; G06F 21/602; H04L 2209/12; H04L 9/002
See application file for complete search history.

(56) References Cited

U.S. PATENT DOCUMENTS 6,272,085 B1 * 8/2001 Maeda ............... G11B 20/1883
369/53.17
6,308,183 B1 * 10/2001 Kawakami ............ G06F 3/0643
(Continued)

OTHER PUBLICATIONS

"Digital Signature Standard (DSS)," U.S. Department of Commerce, National Institute of Standards, Information Technology Laboratory, Federal Information Processing Standards Publication No. 186-4, Jul. 19, 2013, 131 pages.
(Continued)

*Primary Examiner* — Mohammad W Reza
(74) *Attorney, Agent, or Firm* — Sheridan Ross P.C.

(57) ABSTRACT

A hardware accelerator is disclosed for performing a computational operation in a cryptographic application comprises one or more addressable computational blocks and a plurality of addressable register blocks. A bus is used for data exchange between the blocks in the form of read-from-bus operations and write-to-bus operations in the course of performing the computational operation. A controller for controlling the data exchange performs a block addressing operation using a respective pre-assigned first address of the blocks for addressing the one or more of the blocks involved in a write-to-bus operation in the data exchange. The controller performs a dummy-addressing selection operation to select one or more of the blocks for a dummy addressing operation and a dummy-addressing operation of the selected
(Continued)

one or more of the blocks for dummy-addressing the one or more of the selected blocks in the write-to-bus operation.

15 Claims, 6 Drawing Sheets

(56) References Cited

U.S. PATENT DOCUMENTS

| | | | | |
|---|---|---|---|---|
| 2005/0235104 | A1* | 10/2005 | Ohhashi | G11B 27/329 |
| | | | | 711/170 |
| 2021/0097003 | A1* | 4/2021 | Li | G06F 12/0253 |

OTHER PUBLICATIONS

"Electronic Signatures and Infrastructures (ESI); Cryptographic Suites," European Telecommunications Standards Institute, Technical Specification No. 119312, v1.2.1, May 2017, 27 pages.

Chevallier-Mames et al., "Low-Cost Solutions for Preventing Simple Side-Channel Analysis: Side-Channel Atomicity," IEEE Transactions on Computers, vol. 53, No. 6, Jun. 2004, pp. 760-768.

Coron, "Resistance against Differential Power Analysis for Elliptic Curve Cryptosystems," International Workshop on Cryptographic Hardware and Embedded Systems, LNCS vol. 1717, 1999, pp. 292-302.

Dyka et al., "Inherent Resistance of Efficient ECC Designs against SCA Attacks," 8th IFIP International Conference on New Technologies, Mobility and Security (NTMS), Nov. 2016, 5 pages.

Giraud et al., "Atomicity Improvement for Elliptic Curve Scalar Multiplication," International Conference on Smart Card Research and Advanced Applications (CARDIS), LNCS vol. 6035, 2010, pp. 80-101.

Itoh et al., "Address-Bit Differential Power Analysis of Cryptographic Schemes OK-ECDH and OK-ECDSA," International Workshop on Cryptographic Hardware and Embedded Systems (CHES), LNCS vol. 2523, 2003, pp. 129-143.

Johnson et al., "The Elliptic Curve Digital Signature Algorithm (ECDSA)," International Journal of Information Security, vol. 1, 2001, pp. 36-63.

Kabin et al., "EC P-256: Successful Simple Power Analysis," arXiv, 2106.12321, 2021, 5 pages.

Kabin et al., "Methods for Increasing the Resistance of Cryptographic Designs Against Horizontal DPA Attacks," International Conference on Information and Communications Security (ICICS), LNCS vol. 10631, 2018, pp. 225-235.

Kabin et al., "On the Complexity of Attacking Commercial Authentication Products," NTMS Workshop on CyberSECurity on HARDware, 2019, 6 pages.

Kabin et al., "Resistance of the Montgomery kP Algorithm against Simple SCA: Theory and Practice," IEEE Latin-American Test Symposium (LATS), INSPEC Accession No. 19612276, Mar. 30, 2020, 6 pages.

Koblitz, "Chapter VI: Elliptic Curves," in A Course in Number Theory and Cryptography, Springer, New York, NY, Sep. 2, 1994, pp. 167-199.

Koblitz, "Elliptic Curve Cryptosystems," Mathematics of Computation, vol. 48, No. 177, Jan. 1987, pp. 203-209.

Longa, "Accelerating the Scalar Multiplication on Elliptic Curve Cryptosystems over Prime Fields," Thesis submitted to the Faculty of Graduate and Postdoctoral Studies in partial fulfillment of the requirements for the degree of Master of Applied Science in Electrical and Computer Engineering, Ottawa-Carleton Institute for Electrical Computer Engineering, School of Information Technology and Engineering, University of Ottawa, 2007, 188 pages.

Miller, "Use of Elliptic Curves in Cryptography," Conference on the Theory and Application of Cryptographic Techniques (CRYPTO), LNCS vol. 218, 1985, pp. 417-426.

Rondepierre, "Revisiting Atomic Patterns for Scalar Multiplications on Elliptic Curves," International Conference on Smart Card Research and Advanced Applications (CARDIS), LNCS vol. 8419, 2013, pp. 171-186.

Smart et al., "Algorithms, key size and parameters report—2014," European Union Agency for Network and Information Security, Nov. 2014, 113 pages.

Dyka et al., "Multiplier as a Mean for Reducing Vulnerability of Atomic Patterns to Horizontal Address-Bit Attacks," IEEE 10th Mediterranean Conference on Embedded Computing (MECO), Jun. 7, 2021, 6 pages.

Kabin et al., "Horizontal address-bit DPA against Montgomery kP implementation," IEEE International Conference on Reconfigurable Computing and FPGAS (RECONFIG), Dec. 4, 2017, 8 pages.

Moucha et al., "Novel Dummy Rounds Schemes as a DPA Countermeasure in PRESENT Cipher," IEEE 23rd International Symposium on Design and Diagnostics of Electronic Circuits & Systems (DDECS), Apr. 22, 2020, 4 pages.

Extended European Search Report for Europe Patent Application No. 23158541.5, dated Aug. 17, 2023, 8 pages.

* cited by examiner

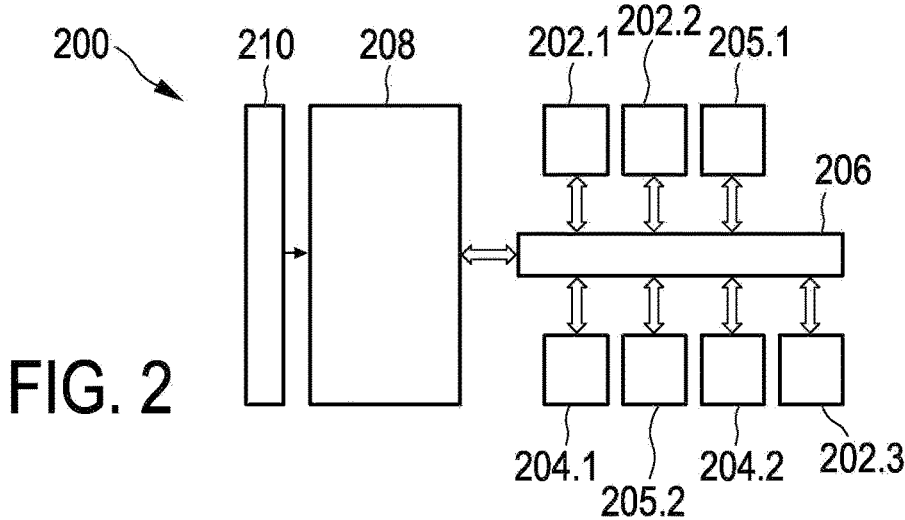
FIG. 2
FIG. 3
| Block | First Block Address | Dummy Block Address 1 | Dummy Block Address 2 |
|---|---|---|---|
| Register 1 202.1 | R1 | R4 | R8 |
| Register 2 202.2 | R2 | R6 | R7 |
| Register 3 202.3 | R3 | R5 | - |
| Compute 1 204.1 | C1 | C3 | C4 |
| Compute 2 204.2 | C2 | - | - |
| Dummy 1 205.1 | - | R9 | - |
| Dummy 2 205.2 | - | C5 | - |
FIG. 4
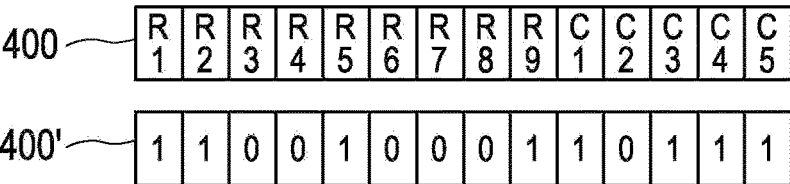

| Write control word | Encoded write control word |
|---|---|
| 000010000000001 | 0000 |
| 000001000000100 | 0001 |
| 000000100000111 | 0010 |
| 000010000001110 | 0011 |
| ... | ... |
| 100010001101000 | 1100 |
| 100001000101100 | 1101 |
| 100100001001110 | 1110 |
| 110100001001110 | 1111 |

CRYPTOGRAPHIC HARDWARE ACCELERATOR WITH DUMMY BLOCK ADDRESSING FOR PROTECTION AGAINST SIDE CHANNEL ATTACKS

CROSS-REFERENCE TO RELATED APPLICATIONS

This application claims the benefit of European Patent Applications No. 22199271.2 filed 30 Sep. 2022 and No. 23158541.5 filed 24 Feb. 2023, the entire contents of which are incorporated herein by reference in their entireties.

FIELD OF THE INVENTION

The present invention relates to a cryptographic hardware accelerator for performing a computational operation in a cryptographic application.

BACKGROUND

Cryptographic protocols using Elliptic Curves (ECs) over finite fields are approaches well known for the generation and verification of digital signatures as well as for mutual authentication. In comparison with the equally known RSA (Rivest-Shamir-Adleman) method, an elliptic curve cryptosystem (ECC) results in memory and band-width savings, the time and energy required for sending and receiving the messages is in fact effectively reduced. These features make ECC very attractive for resource-constrained devices that require not only a high level of security but also low-power, real-time communication and data processing. Nowadays, ECCs are widely used as a means for implementing security requirements in many application areas, especially for the Internet of Things (IoT), autonomous driving, e-health, Industry 4.0, wireless network sensors.

ECC is a variant of public key cryptography. Each communication partner has a public key and a private key which are an assigned pair. The private key is a (long) binary number.

The public key is a point of an elliptic curve over a finite field. The basis operation in EC cryptographic protocols is a multiplication of an EC point P with a scalar k, denoted as an EC point multiplication (kP operation). The kP operation is defined mathematically as a k-times addition of a point P on an elliptic curve to itself. It can thus be calculated as a sequence of EC point additions and doublings. The kP operation is an expensive operation in terms of required time and energy. The acceleration of this task by dedicated cryptographic hardware, herein referred to as EC kP hardware accelerator, speeds up the execution time and provides energy savings.

The security of ECC is based on the secrecy of the private key. The goal of an attacker is thus to reveal the private key. EC-based digital signature protocols use a random number as the scalar k for digital signature generation. In case of successfully revealing the scalar k analyzing statistically the power or electromagnetic trace(s) captured during a signature generation (such attacks are known as side-channel analysis attacks), an attacker can easily calculate the private key used for generating the signature. By EC authentication approaches the scalar k is the private key. Due to these facts, we denote further the scalar k also as a key.

Side Channel Analysis (SCA) attacks are classified into vertical, i.e. multiple-trace, or horizontal, i.e. single-trace, attacks. kP algorithms implemented in hardware often realize a bitwise processing of the scalar k. The processing of a single bit of the scalar k requires many clock cycles. If the sequence of mathematical operations for the processing a bit value '0' differs from the one for the processing a bit value '1', their power profiles will be distinguishable. In this case, the scalar k can be revealed via visual inspection of the single measured trace. Therefore, such implementations are vulnerable to simple SCA attacks.

Well-known countermeasures against simple SCA are known as regularity and atomicity principles. The basic idea of the regularity principle is the processing of each bit of the scalar k using always the same sequence of operations. Particularly, algorithms based on the regularity principle require the same time (number of clock cycles) for processing each key bit value. The atomicity principle proposes to process each bit of the scalar k as a set of (short) sequence of the same operations. The used (short) sequence of operations is called an "atom". Execution of a single atom corresponds to a (small) part of measured power trace denoted as an atomic pattern profile. The main idea of the atomicity principles is that power profiles of atoms are very similar (not distinguishable).

The Montgomery ladder is a known algorithm for calculating kP. Low-cost hardware implementations of the Montgomery ladder, especially for ECs over extended binary finite fields, are widely used for accelerating authentication protocols. The Montgomery ladder based algorithms apply the regularity principle. Additionally, different atomic patterns are well-known and can be applied for calculating kP, especially for ECs over prime fields.

However, hardware implementations of the Montgomery ladder can be vulnerable to horizontal address-bit SCA attacks. A vulnerability of the Montgomery ladder hardware accelerators to vertical address-bit attacks is known since 2002.

One of the known countermeasures against horizontal address bit attacks is introducing noise. This approach is published in the following paper:

Zoya Dyka, Ievgen Kabin, Dan Klann and Peter Langendoerfer: "Multiplier as a Mean for Reducing Vulnerability of Atomic Patterns to Horizontal Address-Bit Attacks", Proc. 10th Mediterranean Conference on Embedded Computing (MECO 2021, Jun. 7 to 10, 2021). DOI:10.1109/MECO52532.2021.9460158

In particular dummy partial multiplication of non-zero operands were proposed as a source of noise in this publication to achieve an always-active field multiplier. A field multiplier calculates field products corresponding to a 4 segment Karatsuba multiplication formula for GF(p) elements. Whenever applicable, instead of waiting for required operands of a partial multiplication, the multiplier calculates dummy non-zero partial products. The dummy partial products do not influence the result of the kP calculation because they are not used in the calculation flow. During this dummy activity, the multiplier consumes additional energy that is a kind of noise. This way, the dummy activity of the multiplier can hide the key-dependent addressing of the blocks. This approach is reported as reducing the success rate of a horizontal address bit attack.

GENERAL DESCRIPTION OF THE INVENTION

An object of the present invention is to improve the resistance of the cryptographic hardware accelerators, which perform computational operations, against horizontal address-bit SCA attacks. Additionally, significantly improving the resistance against vertical address-bit SCA attacks as well as against localized electromagnetic analysis (EMA) and fault injection (FI) attacks is desirable.

According to the present invention, a cryptographic hardware accelerator for performing a computational operation in a cryptographic application comprises one or more addressable computational blocks and a plurality of addressable register blocks, the computational blocks and the register blocks being commonly referred to as blocks herein;

a databus for data exchange between the blocks in the form of read-from-bus operations and write-to-bus operations in the course of performing the computational operation; and a controller for controlling the data exchange, the controller being configured to perform, in the course of performing the computational operation, a block addressing operation, using a respective pre-assigned first address of the blocks for addressing the one or more of the blocks involved in a write-to-bus operation in the data exchange;

a dummy-addressing selection operation to select one or more of the blocks for a dummy-addressing operation, and a dummy-addressing operation of the selected one or more of the blocks, for dummy-addressing the one or more of the selected blocks in the write-to-bus operation; wherein the controller configured to perform the dummy-addressing operation using at least one of a set of one or more respective dummy addresses, which are pre-assigned to the selected one or more of the blocks in addition to their respective first address.

The present invention is based on the recognition that in a data exchange between blocks via the bus, block addressing operations involving different register blocks or computational blocks consume different amounts of power. A widespread assumption in the relevant art that addressing different blocks, for example addressing different registers, is an identical operation in terms of power consumption is no longer true when using modern measurement equipment, at least for hardware implementations. Measurements performed with such equipment disprove this assumption. Therefore, block addressing operations addressing different blocks are distinguishable from each other and key-dependent block addressing operations may be exploited for successful address bit attacks. Known strategies to prevent a simple SCA cannot protect against horizontal address-bit attacks. Each of the binary kP algorithms—despite their regularity or atomicity—involves a key-dependent addressing of register blocks and/or computational blocks.

Furthermore, the present invention breaks with a common implication made in the design and implementation of data exchange processes in cryptographic hardware accelerators. Namely, the present invention recognizes that while it is correct to assign a unique address to each block for implementing the data transfer via the bus in performing a computational operation in a cryptographic application, a commonly implied additional design limitation, namely, to provide and use only one address for each block per block operation (i.e., one address for a write-to-bus operation and one address for a read-from-bus operation), and not more, is overcome by the present invention.

Based on these recognitions, the present invention proposes the use of a dummy-addressing operation of a block. To this end, the controller of the cryptographic hardware accelerator of the invention is not only configured to perform, in the course of performing the computational operation, a block addressing operation using a respective pre-assigned first address of the blocks for addressing the one or more of the blocks involved in a write-to-bus operation in the data exchange. The controller can camouflage the energy consumption of the block addressing operation by its additional capability to perform a dummy-addressing selection operation to select one or more of the blocks for a dummy addressing operation, and a dummy-addressing operation of the selected one or more of the blocks, for dummy-addressing the one or more of the selected blocks in the write-to-bus operation. The dummy-addressing operation is performed by the controller using at least one of a set of one or more respective dummy addresses, which are pre-assigned to the selected one or more of the blocks in addition to their respective first address.

Accordingly, at least one of the blocks may be addressed for at least a write-to-bus operation based on a selection from more than one address, i.e. a set of addresses that is assigned to at least one of the blocks: one address from the set is the first address of the block and all other addresses from the set are dummy addresses of the block. Using any one of the addresses from the set causes the same functionality in the operation of the hardware accelerator, in particular providing the value calculated or stored by the block to the databus; and using more than one addresses from the set in-parallel causes the same functionality as a using a single address from the set.

Thus, while for the purpose of performing a current computational operation in the cryptographic application a respective first address of a block is used for addressing a given block in the write-to-bus operation, the controller may additionally or alternatively select and dummy-address the same block. By using a dummy address of the block that is different from the first address of the block in addition or as an alternative for addressing the same block, a different amount of energy is consumed by the hardware accelerator, one of the reasons being an additional or different routing of control signals involved in addressing the block.

Furthermore, as mentioned, by using a pre-assigned dummy address of the block instead of the equally pre-assigned first address of the block, the dummy addressing operation is still functional in addressing the block for the purpose of the computational operation, no different from using the first address of the block. Also, by using a pre-assigned dummy address of the block not instead of, but in addition to the equally pre-assigned first address of the block, the block is still correctly addressed for the purpose of the computational operation. More than one of the pre-assigned dummy addresses may be used at the same time in addition to the first address, thus adding to the desired camouflaging effect. Also, different dummy addresses and/or different numbers of dummy addresses may be used at different occasions of dummy-addressing a given block in the course of performing the computational operation of the hardware accelerator, further adding to the desired effect.

Only for the purpose of definition of the phrase "computational operation in the cryptographic application" or, in short, of the term "computational operation" in the context of this specification, the dummy-addressing operation is not considered as being comprised by the meaning of the "computational operation in the cryptographic application" or "computational operation".

Moreover, while for the purpose of performing a current computational operation in the cryptographic application the respective first block address of a block is used for addressing the given block in the write-to-bus operation, the controller may additionally select and dummy-address at least one other of the blocks, in addition to addressing the given block using its first address. By additionally dummy addressing a selected one or more of the blocks that is different from the given block, which given block is used for performing the computational operation, a different amount of energy is consumed and dissipated by the hardware accelerator. The dummy addressing operation thus does address a selected block in a write-to-bus operation, but with regard to the computational operation the addressing does not have a functional effect. It adds energy dissipation and makes a determining of the addressed block based on the energy consumption of the block addressing operation difficult if not impossible, which blurs any information that may be detected by a measurement of energy consumption or electromagnetic radiation.

For the dummy-addressing, the controller correspondingly thus uses at least one of the dummy addresses pre-assigned to the blocks. This helps blurring the flow of control signals within the hardware accelerator as well as the "determining" of the blocks performing operation.

This camouflaging of the addressing of blocks of the hardware accelerator required for performing the computational operation of the desired cryptographic application thus prevents or at least reduces the chances of success for the mentioned address bit attacks.

In the following, further embodiments of the cryptographic hardware accelerator of the present invention will be described.

Regarding computational operations considered by the present specification, these generally include different types of operations, in particular both data processing operations, such as calculations, and data storage operations, such as writing to or reading from a data storage such as a register block. However, embodiments of the hardware accelerator of the present invention may limit the application of the dummy-addressing operation to only a fraction of the given types of computational operations, which means one or more, but less than all of the types of computational operations. In particular, the controller may be configured to perform the dummy-addressing operation only in association with block addressing operations to be executed in data processing operations. As an alternative, the controller may be configured to perform the dummy-addressing operation only in association with block addressing operations to be executed in data storage operations. As a further alternative, the controller may be configured to perform the dummy-addressing operation in association with respective block addressing operations to be executed in data processing operations and in association with respective block addressing operations to be executed in data storage operations.

For clarity, the described dummy-addressing operation according to the present invention is associated solely with those blocks of the hardware accelerator that are required for performing the computational operations in performing the cryptographic application, be it in an operational step to be currently performed or in a previous or later operational step. In other words, the provision of dedicated dummy blocks, which are only used for performing dummy-addressing operations and not in actual computational operations of the cryptographic application, is as such not claimed by the present invention. However, dedicated dummy blocks that are not required in performing actual computational operations of the cryptographic application may additionally be provided in addition to the blocks, to further add to the effect of camouflaging the block addressing operation. In such embodiments, where dedicated dummy blocks are provided in addition to the blocks, the controller is preferably configured to additionally select one or more of the dedicated dummy blocks for the dummy-addressing operation of the blocks. Suitably the controller is configured to perform the dummy-addressing using the respective first block address of a selected dedicated dummy block. However, dedicated dummy blocks may also be assigned a plurality of additional dummy block addresses for the controller to select from in the dummy-addressing operation.

Furthermore, additionally or alternatively to the additional provision of dedicated dummy blocks, and also for improving the camouflaging effect, the dummy-addressing may be dynamically associated with the blocks, i.e., those blocks that are required for the computational operations of the hardware accelerator in performing the cryptographic application. In particular, blocks required in the processing step to be currently performed, but in a previous processing step or in a later processing step may be selected by the controller for a dummy-addressing operation. In this case, such a "required block" is thus temporarily used as a dummy block, namely, while it is not required for the processing step to be currently performed. It may thus be called a "temporary dummy block" to distinguish it from a dedicated dummy block described in the previous paragraph.

In such embodiments, the controller may be configured to select the one or more of the blocks as the temporary dummy blocks for performing the dummy-addressing operation from a predetermined set of candidate temporary dummy blocks. The set of candidate temporary dummy blocks may exclude a fraction of the blocks, i.e., none, one, or a plurality of the blocks, but not all the blocks, from the dummy-addressing operation of the blocks. The set of candidate temporary dummy blocks may be fixed. However, as an alternative, it may suitably be designed to vary dynamically in dependence on a given computational operation to be performed. Thus, the controller may be configured to select the temporary dummy block for a dummy-addressing operation in association with a computational operation to be performed from a set of candidate temporary dummy blocks, the set being associated with this particular computational operation. This may include a design of the set that takes into account a dependence on a context of the given computational operation, i.e., required use of blocks in one or several previous or upcoming computational operations.

As described, a given block may be addressed under its pre-assigned first address when needed for the regular computational operation of the cryptographic application, and/or dummy-addressed under one of its pre-assigned dummy addresses. The controller may thus configured to use only the first address of a given block in the block addressing for the purpose of performing the computational operation, and only one or more of the dummy addresses for the dummy-addressing operation of the block. In other words, there may be a fixed distinction between the first address and dummy addresses of the block in the context of the cryptographic application, i.e., a distinction that is valid for each and every computational operation performed in the cryptographic application.

In alternative embodiments, however, the controller is configured to distinguish dynamically between the first address and the dummy addresses of a given block. These embodiments do not include a block addressing operation in the limited conventional sense of using only a fixed pre-assigned address. Rather, only the dummy-addressing selection operation and the dummy-addressing operation are performed. All addresses assigned to a given block together form a unified set of addresses, and the controller is configured, in the course of performing computational operations involving a given block over time, to distinguish dynamically between the first address and the set of dummy addresses for the given block. The controller may be configured, in the course of performing computational operations involving the given block or dedicated dummy block over time, to select one of the block's addresses from the unified set of addresses as the block's first address dynamically in the context of the dummy-addressing selection operation, thus performing the dummy addressing by performing a selection of different first addresses for the given block at different times. In these embodiments, the first address of a given block varies dynamically at different times over a sequence of computational operations. More specifically, for a given block, the controller may be configured, for a given computational operation, to dynamically select one of the assigned addresses of the unified set as the first block address of this given block for a given computational operation. The remaining addresses of the unified set of addresses assigned to this given block then, per definition, are the dummy addresses of this given block, for the given computational operation, to additionally select from in order to perform additional dummy-addressing in the context of the given computational operation. When the same given block is to be addressed a next time for another computational operation in the course of the cryptographic application, the same or another address may be selected from the unified set as the first address of the block.

In one variant to the mentioned alternative embodiments, the controller is configured to perform the block addressing operation and the dummy-addressing operation for the same block in parallel, i.e., it addresses the same block by its first address and additionally by one or more its dummy addresses. Thus, more than one dummy address may be assigned to a given block in this variant. Also, more than one of the blocks may be used for a dummy-addressing operation at a given point in time. In this case, the mentioned variants of camouflaging the block addressing operation may be employed in parallel, but for different blocks.

The hardware accelerator may additionally comprise a random number generator. In this case, the controller may be configured to select the one or more of the blocks to be used in the dummy-addressing operation using a random number received from the random number generator. In particular, the random number may be used to select from the set of candidate temporary dummy blocks. In another variant, the random number may be used to select a dummy address from the set of dummy addresses assigned to a selected block. This further reduces the chances of detecting meaningful block addressing patterns in a SCA attempt.

In alternative embodiments, the controller is configured to select the one or more of the blocks as the dummy blocks for performing the dummy-addressing operation in the course of performing the computational operation using a pre-programmed dummy-block selection sequence.

Different options exist for implementing the block addressing operation and the dummy addressing operation. The controller may for instance be configured to perform the block addressing operation and the dummy-addressing operation for a given write-to-bus operation by encoding the blocks to be addressed in a write control word. The write control word has one allocated bit position per each first address and each dummy address for each block. For instance, the bit value '1' at a given bit position of the write control word may indicate that a block having a first address or a dummy address associated by this bit position of the write control word is to be addressed using this address. And the bit value '0' at this given bit position of the write control word may indicate that this address is not to be used.

The controller may comprise a write selection control register for storing the write selection control word. The write selection control register is suitably connected with the bus via a write logic circuit. Preferably, the write logic circuit receives respective bit values from the blocks and from the write selection control register and is configured, using the bit values and the received bit values of the write selection control word, to address the selected block for a write-to-bus operation in accordance with the write selection control word, and to provide the stored bit value of the selected block to the bus via a pre-determined signaling path through the write logic circuit.

In another exemplary implementation of the addressing operation of a block and of its dummy-addressing operation, the controller may configured to perform the block addressing operation and the dummy-addressing operation for a given write-to-bus operation by encoding the blocks to be addressed in a write control word that has a value range corresponding to the number of possible combinations of first addresses of the blocks and their dummy addresses and assigning one respective value of the write control word to each of the possible combinations of first addresses of the blocks and the dummy addresses of the blocks. In comparison with the implementation described above, this allows using a write control word with a reduced number of bit positions.

In some embodiments, the controller is additionally configured to perform, in the course of performing the computational operation, the block addressing operation, using the respective pre-assigned first address of the blocks for addressing the one or more of the blocks involved in a read-from-bus operation in the data exchange; and to perform a dummy-read-addressing selection operation of one or more of the blocks and a dummy-read-addressing operation of the selected one or more of the blocks, for dummy-addressing the one or more of the selected blocks in the read-from-bus operation; wherein the controller is configured to perform the dummy-read-addressing operation using at least one of the set of the one or more respective dummy addresses, which are pre-assigned to the selected one or more of the blocks in addition to their respective first address.

The optional additional dummy addressing in the context of a read-from-bus operation further adds to the desired effect of making a determining of the addressed block based on the energy consumption of the block addressing operation difficult. In comparison with the dummy addressing in the context of the write-to-bus operation, increased care must be taken in designing the controller to perform the dummy-read-addressing selection operation, so as to avoid errors in the desired computational function of the cryptographic hardware accelerator.

In these embodiments, the controller of the cryptographic hardware accelerator may comprise a read-from-bus selection control register for storing a read-selection control word indicative of the one or more addresses of the at least one block to be addressed in the read-from-bus operation to be performed. In these embodiments, a read logic circuit is preferably provided, which receives input from the bus and from the blocks and from the read-from-bus selection control register to provide the value on the bus to the addressed and/or dummy-addressed blocks.

A second aspect of the present invention is represented by a method for operating a cryptographic hardware accelerator for performing a computational operation in a cryptographic application. The method comprises:

providing one or more addressable computational blocks and a plurality of addressable register blocks, the computational blocks and the register blocks being commonly referred to as blocks herein;

providing a bus for data exchange between the blocks in the form of read-from-bus operations and write-to-bus operations in the course of performing the computational operation; and controlling the data exchange, the controlling comprising, in the course of performing the computational operation, a block addressing operation, using a respective pre-assigned first address of the blocks for addressing the one or more of the blocks involved in a write-to-bus operation in the data exchange; or a dummy-addressing selection operation of one or more of the blocks and a dummy-addressing operation of the selected one or more of the blocks, for dummy-addressing the one or more of the selected blocks in the write-to-bus operation; wherein performing the dummy-addressing operation comprises using at least one of a set of one or more respective dummy addresses, which are pre-assigned to the selected one or more of the blocks in addition to their respective first address.

The method of the second aspect shares the advantages described for the cryptographic hardware accelerator of the first aspect of the present invention. Also, the various embodiments and variants of the cryptographic hardware accelerator find direct correspondence in process features of the method for operating a cryptographic hardware accelerator.

For instance, in an embodiment, selecting the one or more of the blocks for performing the dummy-addressing operation is performed in parallel to a block addressing operation, and the block to be used for the dummy-addressing is selected from a predetermined set of candidate temporary dummy blocks that forms a subset of the blocks.

The method may further comprise additionally providing dedicated dummy blocks in addition to the blocks, and additionally selecting one or more of the dedicated dummy blocks for the dummy-addressing operation.

As explained, at a given instance, only the block addressing operation of a block using a respective pre-assigned first address of the blocks in a write-to-bus operation in the data exchange may be performed. Or a dummy-addressing operation of the block may be performed, for dummy-addressing the block in the write-to-bus operation. Or both, the block addressing operation and the dummy-addressing operation may be performed, both addressing the same block. Or the dummy-addressing operation may address a different block.

Further embodiments will be described in the following with reference to the drawings.

BRIEF DESCRIPTION OF THE DRAWINGS

FIG. 2 is a block diagram of a cryptographic hardware accelerator according to another embodiment of the present invention;

FIG. 3 is an illustration of an exemplary block addressing scheme which includes provisions for dummy-addressing operations, as may be implemented and used in a controller of the hardware accelerator of FIG. 2;

FIG. 4 is an illustration of a write control word that may be used in the hardware accelerator of FIG. 2 based on the exemplary block addressing scheme of FIG. 3 in performing write-to-bus operations and dummy-addressing operations;

FIG. 5 is an illustration of another encoding solution for a write control word to be used for addressing blocks;

DETAILED DESCRIPTION OF EMBODIMENTS

Figure 1:
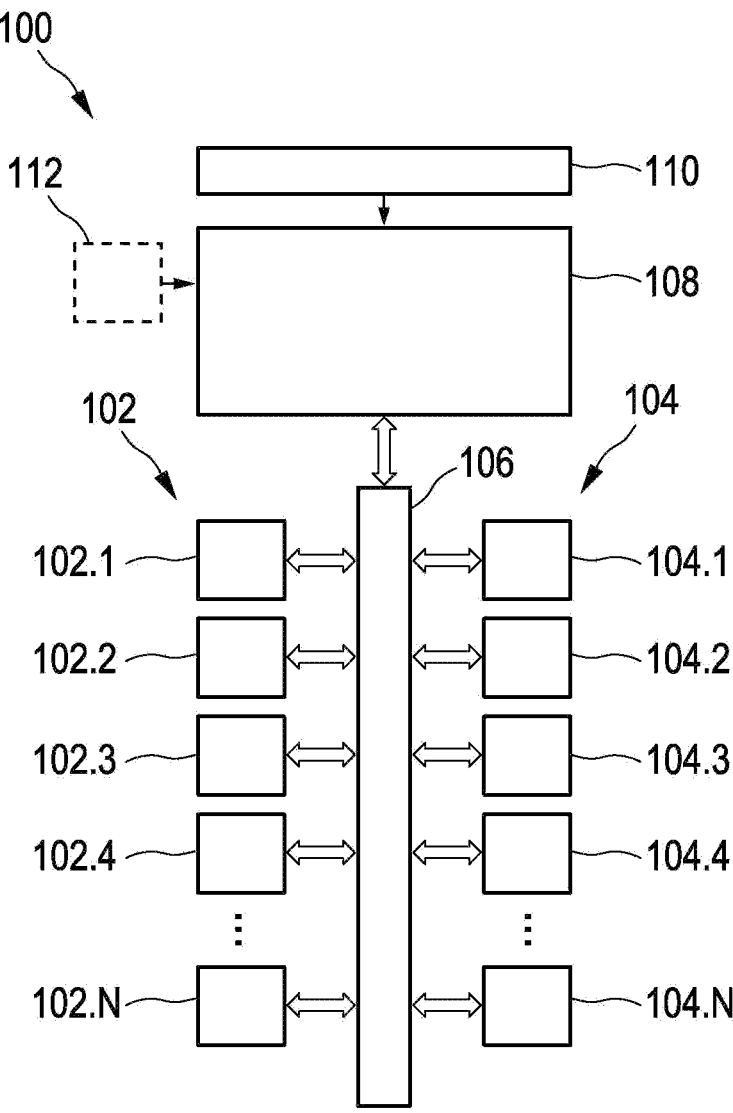
FIG. 1 is a block diagram of a cryptographic hardware accelerator according to an embodiment of the present invention.

FIG. 1 is a block diagram of a cryptographic hardware accelerator 100 according to an embodiment of the present invention. The cryptographic hardware accelerator 100 may in particular be an elliptic curve (EC) kP hardware accelerator. An implementation of a Montgomery kP calculation or any other binary kP algorithm may be implemented in the cryptographic hardware accelerator 100. Such an algorithm implemented in the hardware accelerator 100 performs a bitwise processing of an 1-bit long scalar $k=k_{l-1}k_{l-2}$ $k_{l-3} \ldots k_2k_1k_0$. The scalar k may represent a digital key. A same sequence of operations may be performed for processing each bit of the scalar k, which may be a bit of a key. The Montgomery kP calculation as well as other binary kP algorithms can be represented as a sequence of finite field operations, i.e., multiplications, additions, subtractions, squaring operations, as well as the operations for storing of calculated (intermediate) values or operands into register blocks.

The following description will refer to the cryptographic hardware accelerator 100 in short as hardware accelerator. Different forms of hardware implementation of the hardware accelerator 100 can be used. For instance, some embodiments are monolithic integrated circuits, others are field programmable gate arrays (FPGA).

Depending on the specifics of the application case, the hardware accelerator 100 comprises a suitable number of N addressable computational blocks 102.1, 102.2, 102.3, 102.4, . . . , 102.N. N ranges between 1 and any suitable higher integer. The specific number N of computational blocks may also depend on a selected accelerator design. Some embodiments of EC kP hardware accelerators have two computational blocks. A computational block is instance a multiplier block for performing a field multiplication, or an arithmetic logic unit (ALU) for performing a field addition, field subtraction and/or a field squaring operation. Computational blocks may comprise their own internal registers, which may or may not be subject to dummy-addressing by the controller, depending on a given implementation. Field multiplication, field addition, field subtraction and field squaring operations can be distributed in hardware in different ways. Depending on the application case and hardware implementation, operational capabilities of performing field subtraction or field squaring operations may for instance not be provided in the computational blocks. The following description will summarize the full set of computational blocks 102.1, 102.2, 102.3, 102.4, . . . , 102.N under the single reference label 102.

Furthermore, the hardware accelerator 100 comprises addressable registers 104.1, 104.2, 104.3, 104.4, . . . 104.M, which are also represented in simplified form by a block only. The specific number M of register blocks also depends on the application case. It may range between 2 and any suitable higher integer. The following description will summarize the full set of register blocks 104.1, 104.2, 104.3, 104.4, . . . , 104.N under the single reference label 104.

For the purpose of the following description, where a distinction between the computational blocks 102 and the register blocks 104 is not necessary, reference will be made to them commonly as the blocks 102, 104. The same applies to the computational and register blocks of further embodiments illustrated in other figures.

A bus 106 is provided for data exchange between the blocks 102, 104 in the form of read-from-bus operations and write-to-bus operations in the course of performing the computational and/or a data storing operation. The bus 106 may be realized as a muxer with logic gates that react on an address given by a controller 108 (see below). A write-to-bus operation connects the output of an addressed block to the inputs of all other blocks via the muxer. By a read-from-bus operation only the addressed block accepts the values on its input as data for processing.

A controller 108 is connected with the blocks 102, 104 via the bus 106. The controller 108 is configured to control operation of the blocks 102, 104 in determining an EC point multiplication result. In particular, the controller is configured to control the data exchange between the blocks 102, 104. The data exchange in the course of performing computational and/or data storing operations involves a block addressing operation for addressing any of the blocks involved in the data exchange.

The controller 108 is further configured to perform a dummy-addressing operation of a block as a part of the addressing operation of the block. The dummy-addressing operation comprises additionally addressing one or more of the blocks 102, 104 that are selected as dummy blocks for either a read-from-bus operation or a write-to-bus operation. The blocks used for the dummy-addressing operations may be dedicated dummy blocks that are used only for the dummy-addressing operations. However, the dummy-addressing operations may also be performed using blocks that are used as regular register or computational blocks at other instances during the performance of the computational operation to be performed by the hardware accelerator 100.

The controller 108 may be implemented as a state machine containing also an internal register, inter alia for addressing of the blocks in a write-to-bus operation and in a read-from-bus operation. Other bits of the controller's register are may be used to control a kind of a currently performed operation or manage an execution of the operation clock cycle-by-clock cycle. Thus, using the addresses blocks, the controller 108 manages the data flow between the blocks. Additionally, the controller 108 may manage a sequence of field operations. Depending on the signals of the controller 108 (i.e. depending on the value of certain bits of the controller's register) the ALU may perform addition or squaring. The ALU may take two clock cycles for a squaring operation (one clock cycle for obtaining of the operand and second one for the calculation in fact) and 4 clock cycles for an addition of two elements: the 1st operand will be read from the BUS and written to the internal ALU register then the second operand will be read from the BUS and added to the internal register. The multiplier block may take two clock cycles for obtaining both multiplicands from the BUS and, e.g., 9 clock cycles to calculate a field product.

For implementing the desired control function, the controller 108 receives suitable control information stored in a control data storage 110.

The addressing of blocks can be made even less transparent to an external attacker in a variant, which has a random number generator 112 that is used by the controller to provide an input value for a selection algorithm implemented in the controller 108 for selecting from a set of dedicated dummy blocks one or more dummy blocks that are to be used for a dummy-addressing operation in the context of a current block addressing operation. The random number generator 112 is an optional feature and therefore shown with a dashed outline.

Different variants of performing the dummy-addressing operation will explained in the following with additional reference to FIGS. 2 to 5.

A first variant of performing the dummy-addressing operation will now be explained with reference to FIGS. 2 to 4 in parallel. FIG. 2 is a block diagram of a cryptographic hardware accelerator 200 according to an embodiment of the present invention. FIG. 3 is a table representing an exemplary illustration of a block addressing scheme which includes provisions for dummy-addressing operations, as they may be implemented and used the hardware accelerator 200. FIG. 4 is an illustration of a write control word that may be used in the hardware accelerator 200 of FIG. 2 based on the block addressing scheme of FIG. 3 in performing write-to-bus operations and dummy-addressing operations.

The hardware accelerator 200 has a similar structure as that of FIG. 1, but a limited number of blocks, namely, N=3 register blocks 202.1, 202.2, 202.3, M=2 computational blocks 204.1, 204.2, and two dedicated dummy blocks 205.1, 205.2. This exemplary block structure may be varied to form other embodiments. In particular, the number of register blocks, computational blocks and dummy blocks may be selected differently in accordance with the requirements of an application case. It is noted that the provision of dedicated dummy block is an optional addition and not a requirement in accordance with the present invention. Other embodiments do not have dedicated dummy blocks.

The block addressing scheme implemented in the hardware accelerator 200 of FIG. 2 is illustrated by FIGS. 3 and 4. Corresponding control information stored in the control data storage 208 is represented in table form in FIG. 3, but may take any other suitable form, including a hardwired implementation. The left column of the table of FIG. 3 lists the blocks of the hardware accelerator 200, which are not only listed under their respective reference label, but also with an identifier such "Register1", "Compute1", "Dummy1" for better readability of the following explanation. To perform the block addressing operation for controlling the data exchange in the course of performing the computational operation, the controller 208 addresses the blocks using respective pre-assigned first addresses assigned to the blocks, which in the table of FIG. 3 are shown in the second column from the left and labeled as "first block address". For instance, the register block Register1 has an assigned first address R1, and the block computational block Compute1 has an assigned first address C1. The particular block's addresses shown in FIG. 3 are chosen for explanatory purposes and will typically differ in technical implementations.

In operation, the controller 208 performs the dummy-addressing operation by further addressing the blocks using their respective dummy addresses that are assigned to the blocks in addition to their assigned respective first address. In the present exemplary embodiment, the blocks Register1, Register2, and Register 3 as well as the block Compute1 not only have a first address as assigned by the second column from the left, but also a first dummy address, as shown in the third column from the left which carries the headline "Dummy Block Address 1". Some of the blocks additionally have an assigned second dummy address. For example, the block Register1 has a first dummy address R4, and a second dummy address R8. Other blocks may not have any assigned dummy address, such as the block Compute2 in the present example. The dummy addresses have the structure and appearance of the "regular" first addresses and can thus not be per se recognized as dummies. In the present example, the blocks Dummy1 and Dummy2 are used in dummy-addressing operations only and thus form dedicated dummy blocks. They thus do not have an assigned first block address, but only an assigned dummy address, corresponding to the usage of the dummy addresses and meaningful addresses described herein. More than one pre-assigned dummy address may be provided also for such dedicated dummy blocks.

In operation, the controller 208 of the cryptographic hardware accelerator 200 performs a dummy-addressing operation in parallel to the block addressing operation to be performed. The controller may be configured to perform the block addressing operation for controlling the data exchange in the course of performing the computational operation, by addressing the blocks using respective fixed first addresses assigned to the blocks, and to perform the dummy-addressing operation by further addressing at least one of the blocks using at least one of a set of one or more respective fixed dummy addresses assigned to the at least one of the blocks in addition to its assigned first address corresponding control information defining a sequence of block addressing operations in accordance with the implemented algorithm is stored in the control data storage 210. In accordance with the present invention, some selected or all block addressing operations additionally address one or more of the blocks, which for a particular block addressing operation are selected as dummy blocks for either a read-from-bus operation or a write-to-bus operation. A block selected for a dummy-addressing operation may be addressed twice or even three times in parallel, i.e. at the same time. In case of addressing it twice, it is addressed using its first block address and at the same time using its first or second dummy address. In another implementation, a given block may be addressed under its first address only when needed for the regular computational operation, and under one or more of its assigned dummy addresses when the given block is not needed for the regular computational operation.

The addressing of blocks, which is required for performing the computational and/or data storing operation in a computational kP algorithm is key dependent. Thus, involving dummy-addressing operations which are alternative and may be functional or non-functional for regular key-dependent block computational operations serves to camouflage any patterns in the regular block addressing operations. In absence of the dummy-addressing operations, such patterns might be detectable for example in horizontal address-bit attacks and eventually allow retrieving secret data such processed key bit values, i.e. the bit values of the processed scalar k. Thus, the combination of block addressing operations with dummy-addressing operations prevents or at least reduces the chances of success for the mentioned address bit attacks.

To achieve the desired effect, a dummy-addressing operation need not be performed with each block addressing operation. It may be performed at pre-selected instances during performance of the overall cryptographic computational algorithm. Dummy addressing is in particular useful in the context of any key-dependent block addressing operation that is based on a secret key.

FIG. 4 is an illustration of a particular encoding solution for a write control word to be used for addressing blocks. A general representation of the write control word 400 has a number of bit positions corresponding to the number of blocks to be addressed. The write control word thus has one allocated bit position per each first address of each block and each dummy address of each block. An exemplary assignment of the bit positions is shown for the write control word 400 by a respective entry corresponding to the block addresses used in FIG. 3 in each bit position. The bit value '1' at a given bit position of the write control word may indicate that a block having a first address or a dummy address associated by this bit position of the write control word is to be addressed using this address. And the bit value '0' at this given bit position of the write control word may indicate that this address is not to be used.

The order of the assignment of bit positions to block addresses within the write control word, i.e., the bit position to be used for a given block address, may be pre-stored in the control data storage 210 and can be selected arbitrarily in accordance with a desired implementation design.

An exemplary write control word 400' as used during operation of the hardware accelerator 200 as the bit value '1' for those blocks addresses that are to be included in a current block's addressing operation, and the bit value '0' for those other blocks that are not to be included in the current block's addressing operation. For example, according to the write control word 400', the first address R1 is to be used for the register block Register1, which the dummy address R4 assigned to the same block Register1 is not to be used. However, the dummy block Dummy1 is to be addressed using its dummy address R9, and the computational block Compute1 is to be addressed under its first address C1 and additionally using a first dummy address C3 and using a second dummy address C4.

FIG. 5 is an illustration of another encoding solution for a write control word to be used for addressing blocks. In the left column, the general representation of exemplary write control words with a number of bit positions corresponding to the number of blocks to be addressed is given and corresponds to the representation illustrated in FIG. 4. In the right column, an associated encoded write control signal is shown for each write control word in the left column. The assignment is between write control word and encoded write control word is unique and typically made in a design or configuration phase of the hardware accelerator. In the present example, each encoded write control word corresponds to a binary order number assigned to each write control word in the left column. By use of this way of encoding, the write control number can be made shorter. Since not all possible values of the write control word of the type given in the left column will be assumed in a particular implementation, the encoded write control word in the right column.

Figure 6:
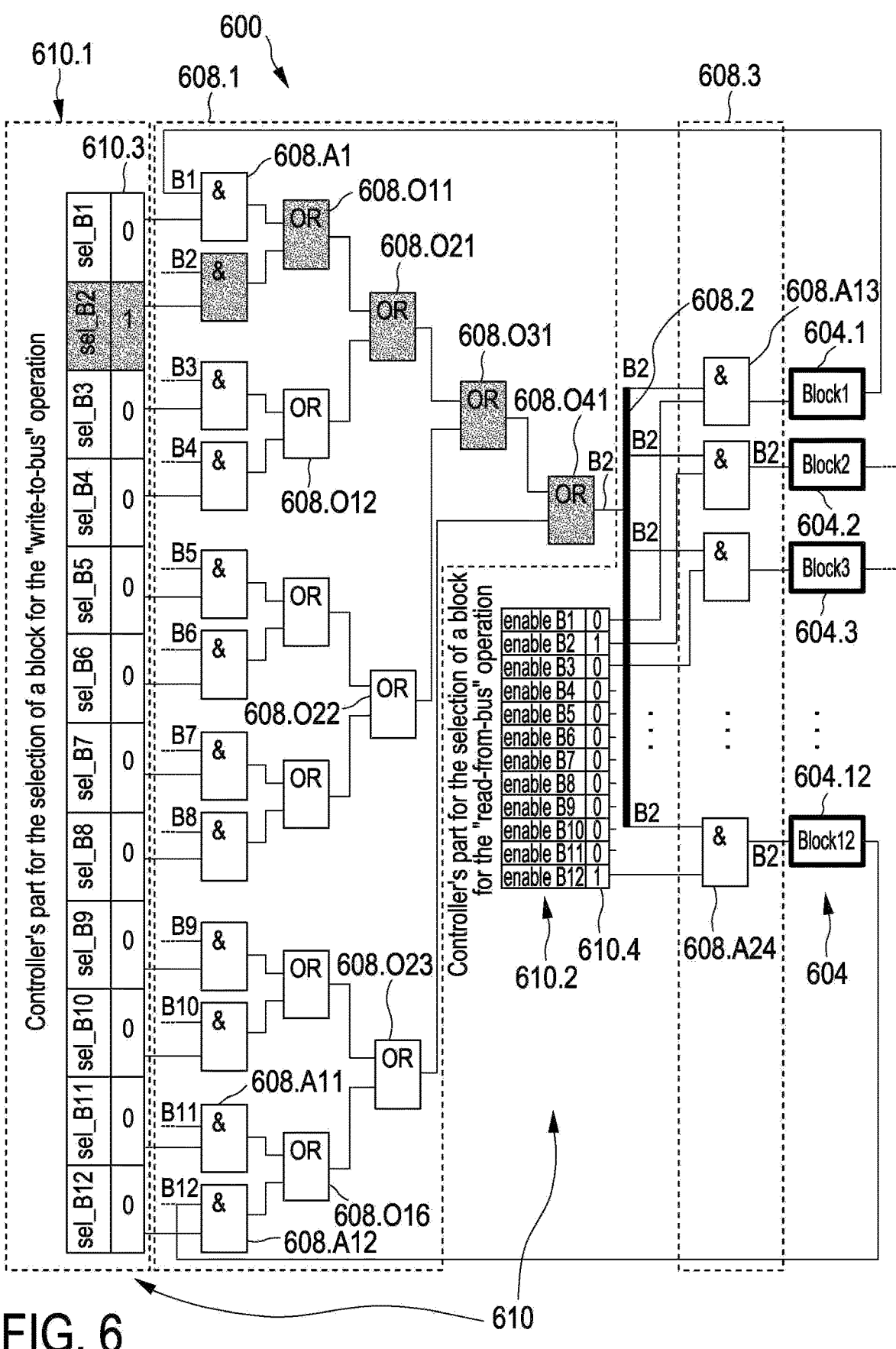
FIG. 6 is a simplified block diagram of another exemplary cryptographic hardware accelerator.
Figure 7:
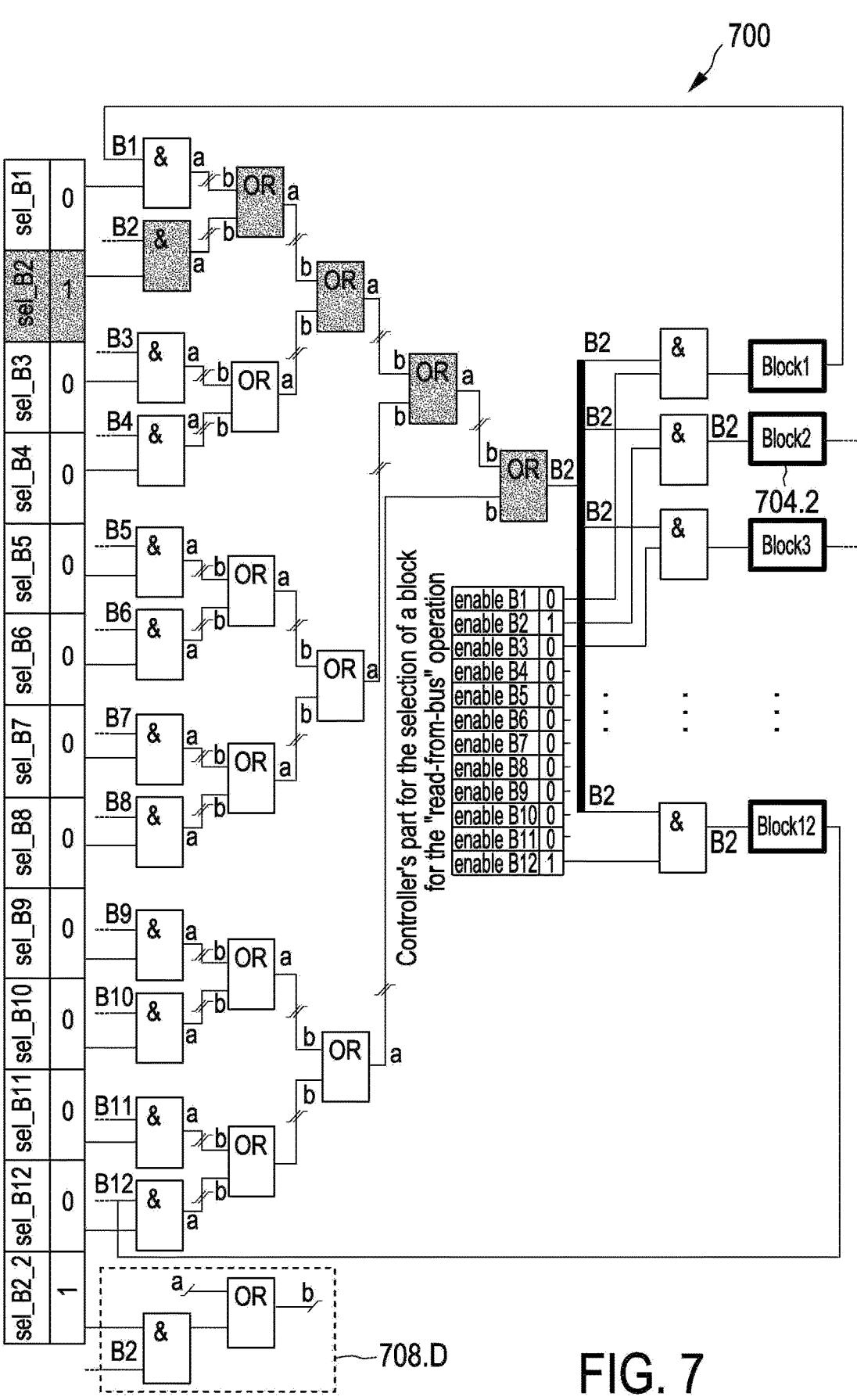
FIG. 7 is an illustration of another hardware accelerator, which is a variant of the hardware accelerator of FIG. 6.

The following description of FIGS. 6 and 7 turns to a concept of hardware implementation that is capable of implementing dummy-addressing operations in both read-from-bus operations (FIG. 6) and write-to-bus operations (FIG. 7).

FIG. 6 is a simplified block diagram of an exemplary cryptographic hardware accelerator 600. The cryptographic hardware accelerator has a controller 610 with a write-to-bus control part 610.1, a read-from-bus control part 610.2, write-to-bus selection control register 610.3 and a read-from-bus control register 610.4. The write-to-bus control part 610.1 is fed by the write-to-bus selection control register 610.3 of the controller 610 that receives and stores a write control word to be used for a current write-to-bus block addressing operation. In the write-to-bus control register 610.3, a respective bit sel_Bi, i=1, 2, 3, . . . , 12, is set to the high value if a corresponding block 604.i, i=1, 2, 3, . . . , 12 of the blocks 604.1, 604.2, 604.3, . . . , 604.12 is to be selected for writing the bit Bi. i=1, 2, 3, . . . , 12, stored in the selected block to the databus 608.2. The write control word in this exemplary implementation thus corresponds to that explained in the context of FIG. 4. A write logic circuit comprised by a write-to-bus control part 608.1 comprises a multiplexer circuit that provides a write signaling path for controlling provision of the bit value stored in the register 604.i to the databus 608.2. Specifically, the write logic circuit comprises an input layer of parallel AND-gates 608.Ai, that is 608.A1, 608.A2, . . . 608.A11, 608.A12. Each of the AND-gates 608.Ai receives the stored bit value Bi from an associated one of the blocks 604.i and an associated selection control bit sel Bi of the write selection control word stored in the write-to-bus selection control register 610.1. It is noted that the present example, for reasons of simplicity of illustration, only shows one bit wide inputs for the blocks 604.1, 604.2, . . . 604.12. In real-life implementations, the inputs to the blocks have a larger width, providing several bits in parallel. Thus, the inputs and outputs of the logic circuit blocks 608.A13 to 608.A24 are usually n bits wide. Only because of this simplification made in the design of FIG. 6, the exemplary embodiment of FIG. 6 shows simple logic gates. In other embodiments, the logic implemented here for instance by simple AND-gates such as the AND-gate 608.A13 is implemented as a more complex logic circuit block with a plurality of AND-gates.

Returning to the description of the simplified example of FIG. 6, the write logic circuit 608.1 further comprises one or more subsequent layers of parallel OR-gates which each receive input from a respective unique pair of the gates of the respective preceding layer, until the bus receives input from a last layer having one OR-gate. For instance, as shown in FIG. 6, a first layer of OR-gates contains six OR-gates 608.O1j, j=1, 2, . . . 6, a second layer contains 3 OR-gates 608.O21, 608.O22, 608.O23, and a third and fourth layer each contain one OR-gate 603.O31 and 608.O41, each fed with input from a pair of OR-gates in the preceding layer.

Similarly, the read-from-bus control part 610.2 has a read-from-bus control register 610.4 storing a read control word, and a read logic circuit 608.3. The read logic circuit is formed of a layer of parallel AND-gates 608.Ak, k=13, 14, 15, . . . 24 connected between the databus 608.2 and the blocks 604. Each AND-gate 608.Ak receives input from the databus 608.2 and from an associated read selection bit value of the read selection control word stored in the read-from-bus control register 610.4. The read control word is structured in the same way as the write control word.

A standard process according to the prior art, i.e., if each block has only one address (referred to as "first address" hereinabove), would be as follows: according to an implemented algorithm, in order to organize the necessary data flow, the block B2 (for example) is addressed by its single address for a "write-to-bus" operation, using the "sel_B2" control signal to give its value to databus. Of course, according to such standard process, another block than B2 (e.g. Bx) should be addressed for a "read-from-bus" operation in order to take the value from databus. This way, the value of B2 is written to Bx. This happens in the clock cycles that serve the correct data flow according to the implemented algorithm The following is a description of an exemplary new process according differing from such a standard process, based on the illustrative example of FIG. 6. In a moment of operation illustrated in FIG. 6, the second register block 604.2 is selected for a write-to-bus operation using its first address "B2" as a control signal "sel_B2" that has a high value on the bit position associated with the register block 604.2, and low values associated with all other blocks 604.1, 604.3, . . . , 604.12, which have first addresses "Bi", i=1, 2, 3 . . . , 12. A write signalling path is indicated by a grey filling of the rectangles representing the logic gates involved in providing the stored bit value B2 of the selected block 604.2 to the databus 608.2. In the illustrated moment of operation, two register blocks—604.2 and 604.12—are selected for reading from the databus 608.2, which result in the register block 604.2 storing the same bit value B2 provided in the concurrent write-to-bus operation, For the purpose of the present illustrative example, the register block 604.12 is selected as a meaningful block for an addressing operation associated with a read-from-bus operation. This block 604.12 will thus also receive the value B2 provided by the register block 604.2 to the databus 608.2. The operation of addressing block 604.12 may for instance be a functional operation that is required in performing the actual function of the hardware accelerator. So, the value of B2 is stored in block 604.12 as B12 as a part of the normal function of the implemented computation algorithm.

The concurrent dummy addressing of B2 for the read-from-bus camouflages the whole addressing in this clock cycle. The register block 604.2 is selected as a temporary dummy block for a dummy addressing operation associated with a read-from-bus operation. Such re-storing of the bit value B2 in the block 604.2 forms a dummy operation.

To mention some of the many possible variants of this example, more than one block can receive the value from the databus corresponding to an algorithm implementation, i.e. meaningfully. Also, more than one block may be selected for use as a temporary dummy block for the dummy addressing operation. The values previously stored in the temporary dummy blocks can be overwritten with a new value from the databus 608.2. Instead of using the block 604.2 as a temporary dummy block, a dedicated dummy block can be provided for use in a write-to-bus operation.

Notably, selecting a temporary dummy block or a set of other blocks for a dummy-addressing operation that involves a write-to-bus operation causes writing a dummy value to the databus and is possible only if no block storing meaningful data reads the data from the databus, unless the controller uses another temporary or dedicated dummy block that reads the data from the databus.

In summary of the above, addressing the block B2 in one clock cycle (e.g. using its first address) and simultaneously (in the same clock cycle) writing to the block B2 leaves the value stored in B2 unchanged and thus does not serve a functional data flow, but camuflages the power of the addressing using, in the present example, dummy addressing in the context of simultaneously performing a write-to-bus operation and a read-from-bus operation in the same clock cycle. While a writing process of a new value equal to the old value in a block does not cause additional energy consumption in an actual write process, additionally dummy addressing the block does cause energy consumption, thereby camouflaging the addressing of blocks. Additionally, using a plurality of dummy addresses for dummy addressing in the context of a write-to-bus and/or a read-from-bus operation can improve the desired camouflaging effect. Thus, additionally using one or more dummy addresses for a dummy addressing operation provides a camouflaging effect that may be used to alone or in combination with other measures that have a similar camouflaging effect.

FIG. 7 illustrates a hardware accelerator 700, which is a variant of the hardware accelerator of FIG. 6 to include an additional dummy addressing capability for write-to-bus operations. The following description focusses on differences only. The hardware accelerator 700 additionally includes at least one dummy logic sub-circuit 708.D. The dummy logic sub-circuit 708.D comprises, in comparison with the embodiment of FIG. 6, an additional AND gate and an additional OR gate. The dummy write logic sub-circuit receives the bit value from a pre-determined associated block, which in the present exemplary case is the register block 704.2.

The dummy logic sub-circuit 708.D may be connected to the write logic circuit at one of many possible points. Also, more than one dummy logic sub-circuit may be used. The input labelled "a" in a given dummy logic sub-circuit 708.D and its output labelled "b" may be connected to any opening "ab" of the wires between logic gates of the write logic circuit in FIG. 7. This way, the write logic circuit comprises, in addition to a foreseen first write signalling path through the write logic circuit for controlling provision of the stored bit value of the respective pre-determined associated block to the bus when selected in performing the computational operation, a parallel second write signalling path through the write logic circuit for controlling provision of the stored bit value of the respective associated block to the bus. The second write signalling path through the write logic circuit includes the dummy write logic sub-circuit, which receives the respective bit value from the 704.2, but thus differs from the first write signalling path described in the context of FIG. 2. This way, a dummy-addressing operation can be performed in the context of a write-to-bus operation. Any additional signal processing path generated by addressing the one or more dummy logic sub-circuits 708.D provides additional energy consumption as well as electromagnetic radiation that camouflage the actual block addressing operation.

Figure 8:
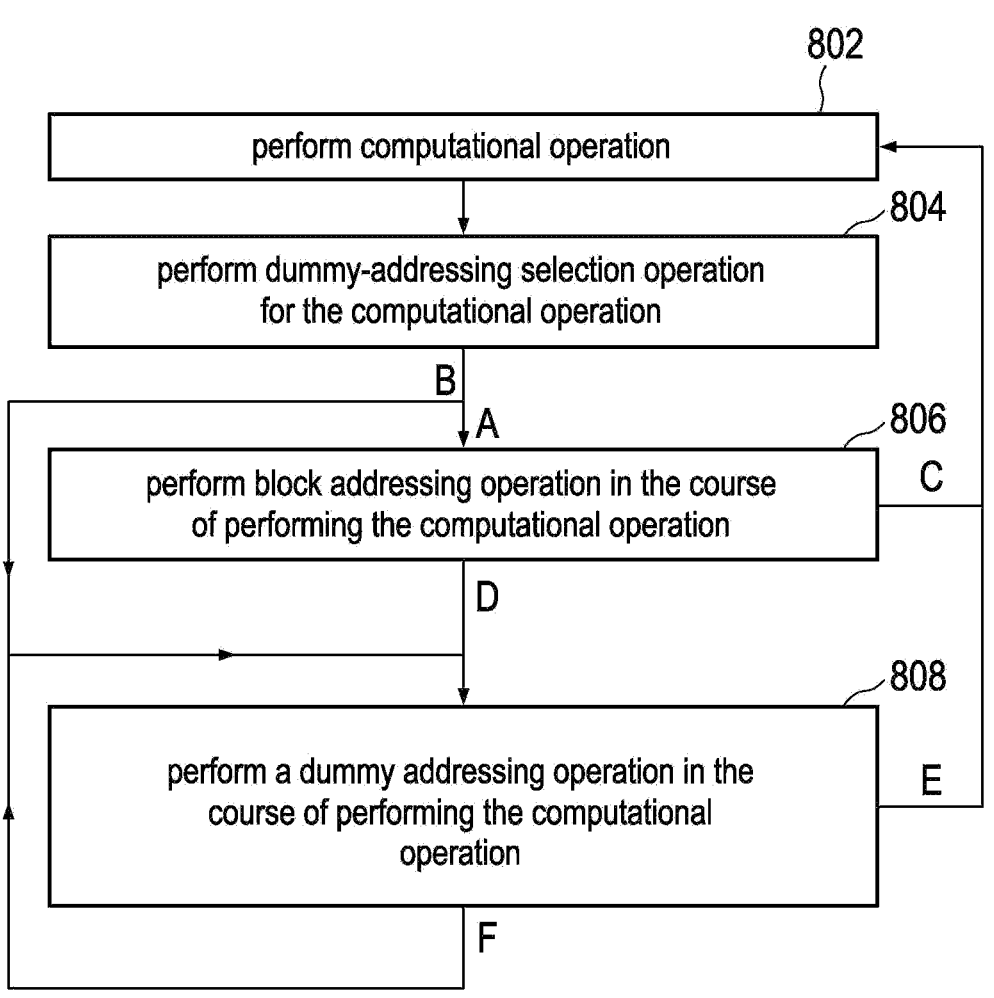
FIG. 8 is a flow diagram of a method for operating a cryptographic hardware accelerator for performing a computational operation in a cryptographic application.

FIG. 8 is a flow diagram of a method for operating a cryptographic hardware accelerator for performing a computational operation in a cryptographic application. The method is based on a cryptographic hardware accelerator that provides one or more addressable computational blocks and a plurality of addressable register blocks (again commonly referred to as blocks). Furthermore, the hardware accelerator provides a bus for data exchange between the blocks in the form of read-from-bus operations and write-to-bus operations in the course of performing the computational operation. In operation of the hardware accelerator, a computational operation is performed (step 802). The computational operation involves a data exchange between the blocks via the databus. In controlling the data exchange, a controller performs a dummy-addressing selection operation for the computational operation. In the dummy-addressing selection operation, the controller determines whether or not to perform one or more dummy addressing operations in the course of the computational operation, and if one or more dummy addressing operations are to be performed, selects a number of dummy addressing operations and the one or more dummy addresses to be used in the dummy addressing.

Depending on the selection, different branches of the flow diagram of the method will be followed in the following.

a) In the dummy-addressing selection operation of step 804, the controller may determine that no dummy addressing is to performed for the current computational operation. In this case, the subsequent processing follows along branches A and C of the flow diagram. In particular in step 806, a block addressing operation in the course of performing the computational operation is performed. In this case, the controller uses what is called the first address in the context of the present specification for addressing the block. After performing the block addressing in the context of the current computational operation, the method branches back to step 802 via branch C to performing the next computational operation. It is noted that the present description of FIG. 8 is not intended to seek patent protection for an embodiment in which only the present variant a) of the process flow is performed at all times if each block has only a single address for the write-to-bus operation as well as a single address for the read-from-bus operations.

b) In the dummy-addressing selection operation, the controller may determine that the block mentioned in variant a), i.e., the block which necessarily needs to be addressed in the context of performing the current computational operation, shall be addressed using only a pre-assigned dummy address that is different from the pre-assigned first address that would be used in step 806. In this case, the processing flow follows branches B and E, jumping from step 804 to step 808, in which the dummy addressing is performed, and then back to step 802 for the next computational operation.

c) In the dummy-addressing selection operation of step 804, the controller may determine that the block to be addressed in the context of the current computational operation shall be addressed using not one, but a plurality of dummy addresses only, which dummy addresses are different from the pre-assigned first address that would be used in step 806. In this case, the processing flow follows branches B, F, and E, repeating the dummy addressing of step 808 for as many addresses as determined in the dummy-addressing selection operation, and then jumps from step 808 to step 802 for the next computational operation.

d) In the dummy-addressing selection operation of step 804, the controller may determine that the same block to be addressed in the context of the current computational operation shall be addressed using both a pre-assigned first address and one dummy address. In this case, the processing flow follows branches A, D, and E.

e) In the dummy-addressing selection operation of step 804, the controller may determine that the same block to be addressed in the context of the current computational operation shall be addressed using both a pre-assigned first address and a plurality of dummy addresses. In this case, the processing flow follows branches A, D, F, and eventually E (after having assigned all dummy addresses).

Here, it should be noted that the used graphical representation in the form of a flow diagram in FIG. 8 is not to be understood as limiting the technical options for implementing the different cases. As an example, this case e) may be implemented by a performing in parallel the steps along the branches A and C and D, F and E. Also, dummy-addressing with multiple dummy addresses is suitably performed in just one step, that means, not by a sequence of a single dummy addressing steps.

f) In different further variants of the dummy-addressing selection operation of step 804, the controller may determine that the block to be addressed in the context of the current computational operation shall be addressed using its pre-assigned first address, and that one or more temporary dummy blocks or, if present, dedicated dummy blocks shall be dummy-addressed, respectively. In this case, the processing flow follows branches A, D, F, and eventually E (after having assigned all dummy addresses). It is noted that the present description of FIG. 8 is not intended to seek patent protection for an embodiment in which only dedicated dummy blocks are used for dummy addressing if each of the dummy blocks has only a single address per write-to-bus or read-from-bus operation.

g) In different further variants of the dummy-addressing selection operation of step 804, the controller may determine that the block to be addressed in the context of the current computational operation shall be addressed using one or more pre-assigned dummy addresses, and that one or more temporary dummy blocks or, if present, dedicated dummy blocks shall be dummy-addressed. In this case, the processing flow follows branches B, D, F, and eventually E (after having assigned all dummy addresses).

The dummy-addressing selection operation may be implemented in the form of hardwired functionality of a controller of the hardware accelerator, for instance providing pre-defined respective dummy-addressing selection operations for the individual computational operations to be performed. The dummy-addressing selection operation may alternatively or partly be implemented in the form of software executed by a control processor.

According to the present invention, thus, a hardware accelerator for performing a computational operation in a cryptographic application comprises one or more addressable computational blocks and a plurality of addressable register blocks, commonly referred to as blocks. A bus is used for data exchange between the blocks in the form of read-from-bus operations and write-to-bus operations in the course of performing the computational operation. A controller for controlling the data exchange performs, in the course of performing the computational operation, a block addressing operation, using a respective pre-assigned first address of the blocks for addressing the one or more of the blocks involved in a write-to-bus operation in the data exchange. In this context, it also performs a dummy-addressing selection operation to select one or more of the blocks for a dummy addressing operation, and a dummy-addressing operation of the selected one or more of the blocks, for dummy-addressing the one or more of the selected blocks in the write-to-bus operation. The controller performs the dummy-addressing operation using at least one of a set of one or more respective dummy addresses, which are pre-assigned to the selected one or more of the blocks in addition to their respective first address.

The invention claimed is:

1. A cryptographic hardware accelerator for performing a computational operation in a cryptographic application, comprising one or more addressable computational blocks and a plurality of addressable register blocks, the computational blocks and the register blocks being commonly referred to as blocks herein; a databus for data exchange between the blocks in the form of read-from-bus operations and write-to-bus operations in the course of performing the computational operation; and a controller for controlling the data exchange, the controller being configured to perform, in the course of performing the computational operation, a block addressing operation, using a respective pre-assigned first address of the blocks for addressing the one or more of the blocks involved in a write-to-bus operation in the data exchange; and a dummy-addressing selection operation to select one or more of the blocks for a dummy addressing operation, and a dummy-addressing operation of the selected one or more of the blocks, for dummy-addressing the one or more of the selected blocks in the write-to-bus operation; wherein the controller is configured to perform the dummy-addressing operation using at least one of a set of one or more respective dummy addresses, which are pre-assigned to the selected one or more of the blocks in addition to their respective first address.

2. The cryptographic hardware accelerator of claim 1, wherein dedicated dummy blocks are provided in addition to the blocks, and wherein the controller is configured to additionally select one or more of the dedicated dummy blocks for the dummy-addressing operations.

3. The cryptographic hardware accelerator of claim 1, wherein the controller is configured to select the one or more of the blocks for performing the dummy-addressing operation in parallel to a block addressing operation from a predetermined set of candidate temporary dummy blocks, which forms a subset of the blocks.

4. The cryptographic hardware accelerator of claim 1, wherein the first address and the dummy addresses assigned to a given block, and, if present, a given dedicated dummy block, together form a unified set of addresses assigned to the given block, and wherein the controller is configured, in the course of performing computational operations involving the given block or dedicated dummy block over time, to select one of the block's addresses from the unified set of addresses as the block's first address dynamically, thus performing the dummy addressing by performing a selection of different first addresses for the given block at different times.

5. The cryptographic hardware accelerator of claim 1, wherein the controller is configured to perform the block addressing operation and the dummy-addressing operation in parallel for the same block.

6. The cryptographic hardware accelerator of claim 1, further comprising a random number generator, wherein the controller is configured to select a temporary dummy block from a set of candidate temporary blocks using a random number received from the random number generator, or to select a dummy address from the set of dummy addresses assigned to a block for use in the dummy-addressing operation using a random number received from the random number generator.

7. The cryptographic hardware accelerator of claim 1, wherein the controller is configured to select the one or more of the blocks as the dummy blocks for performing the dummy-addressing operation in the course of performing the computational operation using a pre-programmed dummy-block selection sequence.

8. The cryptographic hardware accelerator of claim 1, wherein the controller is configured to perform the block addressing operation and the dummy-addressing operation for a given write-to-bus operation by encoding a block's address in a write control word that has one allocated bit position per each first address and each dummy address of each block.

9. The cryptographic hardware accelerator of claim 8, wherein the controller comprises a write-to-bus selection control register for storing the write control word;

the write-to-bus selection control register is connected with the bus via a write logic circuit;

the write logic circuit receives respective bit values from the blocks and from the write-to-bus selection control register and is configured, using the block's bit values and the received bit values of the write-to-bus selection control word, to address a selected block for a write-to-bus operation in accordance with the write-to-bus selection control word, and to provide the stored bit value of the selected block to the bus via a pre-determined signaling path through the write logic circuit.

10. The cryptographic hardware accelerator of claim 1, wherein the controller is configured to perform the block addressing operation and the dummy-addressing operation for a given write-to-bus operation by encoding the block's address in a write control word that has a value range corresponding to the number of possible combinations of first address and dummy addresses and assigning one respective value to each of the possible combinations of first address and dummy addresses.

11. The cryptographic hardware accelerator of claim 1, wherein the controller is additionally configured to perform, in the course of performing the computational operation, the block addressing operation, using the respective pre-assigned first address of the blocks for addressing the one or more of the blocks involved in a read-from-bus operation in the data exchange; and to perform a dummy-read-addressing selection operation of one or more of the blocks and a dummy-read-addressing operation of the selected one or more of the blocks, for dummy-addressing the one or more of the selected blocks in the read-from-bus operation; wherein the controller is configured to perform the dummy-read-addressing operation using at least one of the set of the one or more respective dummy addresses, which are pre-assigned to the selected one or more of the blocks in addition to their respective first address.

12. The cryptographic hardware accelerator of claim 1, wherein the controller comprises a read-from-bus selection control register for storing a read selection control word indicative of the one or more addresses of at least one block to be addressed in the read-from-bus operation to be performed.

13. A method for operating a cryptographic hardware accelerator for performing a computational operation in a cryptographic application, comprising providing one or more addressable computational blocks and a plurality of addressable register blocks, the computational blocks and the register blocks being commonly referred to as blocks herein;

providing a databus for data exchange between the blocks in the form of read-from-bus operations and write-to-bus operations in the course of performing the computational operation; and controlling the data exchange, in the course of performing the computational operation, the controlling comprising, a block addressing operation, using a respective pre-assigned first address of the blocks for addressing the one or more of the blocks involved in a write-to-bus operation in the data exchange; and a dummy-addressing selection operation of one or more of the blocks and a dummy-addressing operation of the selected one or more of the blocks, for dummy-addressing the one or more of the selected blocks in the write-to-bus operation; wherein performing the dummy-addressing operation comprises using at least one of a set of one or more respective dummy addresses, which are pre-assigned to the selected one or more of the blocks in addition to their respective first address.

14. The method of claim 13, comprising selecting the one or more of the blocks for performing the dummy-addressing operation of a block in parallel to a block addressing operation from a predetermined set of candidate temporary dummy blocks that forms a subset of the blocks.

15. The method of claim 13, further comprising additionally providing dedicated dummy blocks in addition to the blocks, and additionally selecting one or more of the dedicated dummy blocks for the dummy-addressing operations.

\* \* \* \* \*